United States Patent
Yaginuma et al.

(10) Patent No.: US 10,312,528 B2
(45) Date of Patent: Jun. 4, 2019

(54) FUEL CELL STACK

(71) Applicant: NISSAN MOTOR CO., LTD., Yokohama-shi, Kanagawa (JP)

(72) Inventors: Motoki Yaginuma, Kanagawa (JP); Akira Yasutake, Kanagawa (JP)

(73) Assignee: NISSAN MOTOR CO., LTD., Yokohama-Shi (JP)

(*) Notice: Subject to any disclaimer, the term of this patent is extended or adjusted under 35 U.S.C. 154(b) by 0 days.

(21) Appl. No.: 15/573,296

(22) PCT Filed: May 13, 2015

(86) PCT No.: PCT/JP2015/063753
§ 371 (c)(1),
(2) Date: Nov. 10, 2017

(87) PCT Pub. No.: WO2016/181522
PCT Pub. Date: Nov. 17, 2016

(65) Prior Publication Data
US 2018/0138524 A1 May 17, 2018

(51) Int. Cl.
H01M 8/02 (2016.01)
H01M 8/0258 (2016.01)
H01M 8/24 (2016.01)
H01M 8/2483 (2016.01)
H01M 8/04119 (2016.01)
(Continued)

(52) U.S. Cl.
CPC .......... H01M 8/0258 (2013.01); H01M 8/02 (2013.01); H01M 8/0273 (2013.01); H01M 8/04156 (2013.01); H01M 8/1018 (2013.01); H01M 8/24 (2013.01); H01M 8/242 (2013.01); H01M 8/2483 (2016.02); H01M 2008/1095 (2013.01); Y02P 70/56 (2015.11)

(58) Field of Classification Search
None
See application file for complete search history.

(56) References Cited

U.S. PATENT DOCUMENTS 6,613,470 B1 9/2003 Sugita et al.
6,794,079 B2 9/2004 Inagaki et al.
(Continued)

FOREIGN PATENT DOCUMENTS

CA 2015799 C 11/1994
CA 2896297 A1 7/2014
(Continued)

Primary Examiner — Scott J. Chmielecki
(74) Attorney, Agent, or Firm — Foley & Lardner LLP

(57) ABSTRACT

A fuel cell stack includes a stacked plurality of single cells that includes respective membrane electrode assemblies 1 with peripheral frames 51 and respective pairs of separators 2A, 2B holding the frames 51 and the membrane electrode assemblies 1 between them, in which the frames 51 and the separators 2A, 2B of the single cells C include respective distribution holes H3 that continue to each other in the stacked position to form a manifold M3 for distributing reaction gas, at least a part of the inner wall of the manifold M3 is formed in a continuous flat shape that extends in the stacking direction of the single cells C. Generated water is suitably discharged through the manifold M3 without a decrease of the flowability of reaction gas and an increase of the production cost.

4 Claims, 7 Drawing Sheets

(51) Int. Cl.
    *H01M 8/1018*     (2016.01)
    *H01M 8/242*     (2016.01)
    *H01M 8/0273*     (2016.01)

(56) References Cited

U.S. PATENT DOCUMENTS

| | | |
|---|---|---|
| 7,709,123 B2 | 5/2010 | Kawabata et al. |
| 7,981,569 B2 | 7/2011 | Shirahama |
| 8,202,666 B2 | 6/2012 | Kanao et al. |
| 8,974,980 B2 | 3/2015 | Oku et al. |
| 9,543,594 B2 | 1/2017 | Wantanabe et al. |
| 2002/0192532 A1 | 12/2002 | Inagaki et al. |
| 2004/0115508 A1 | 6/2004 | Noto |
| 2008/0268324 A1 | 10/2008 | Lemasson et al. |
| 2009/0246586 A1 | 10/2009 | Kawabata et al. |
| 2009/0253010 A1 | 10/2009 | Kanao et al. |
| 2010/0003580 A1 | 1/2010 | Shirahama |
| 2013/0014377 A1* | 1/2013 | Watanabe ............ H01M 8/0247 29/527.1 |
| 2013/0115541 A1 | 5/2013 | Oku et al. |
| 2015/0086899 A1* | 3/2015 | Iritsuki ............... H01M 8/0258 429/463 |

FOREIGN PATENT DOCUMENTS

| | | |
|---|---|---|
| JP | 2003-077498 A | 3/2003 |
| JP | 2004-213972 A | 7/2004 |
| JP | 2007-250232 A | 9/2007 |
| JP | 4551746 B | 9/2010 |
| JP | 2011-044351 A | 3/2011 |
| KR | 10-2008-0100804 | 11/2008 |
| KR | 10-2011-0059381 A | 6/2011 |

\* cited by examiner

FUEL CELL STACK

TECHNICAL FIELD

The present invention relates to an improvement of fuel cells such as polymer electrolyte fuel cells, in particular to a fuel cell stack in which a plurality of single cells each including a membrane electrode assembly and a pair of separators is stacked.

BACKGROUND ART

For example, one of such fuel cell stacks in the art is described in Patent Document 1. The fuel cell stack described in Patent Document 1 includes electrolyte-electrode assemblies and metal separators that are alternately stacked in the horizontal direction, in which fluid communication holes for distributing coolant or reaction gas penetrate in the stacking direction. Further, the fuel cell stack is configured such that insulative members are provided to the metal separators to cover the surfaces of the metal separators and the inner walls of the fluid communication holes so that the sealing property against the coolant or the reaction gas is secured by means of the insulative members.

CITATION LIST

Patent Documents

Patent Document 1: JP 4551746B

SUMMARY OF INVENTION

Technical Problem

In fuel cell stacks as describe above, water is generated along with power generation, and a fluid discharging communication hole is used also as a route for discharging the generated water among the fluid communication holes formed in the stacking direction. However, a problem with the conventional fuel cell stack is that the generated water is likely to be retained inside the fluid communication hole since the fluid communication holes have uneven inner walls due to the gaps between the layers, and it has been required to solve the problem.

For example, a possible measure for preventing such retention of the generated water in the fluid communication hole is to cover the entire inner wall of the fluid communication hole with an insulative member. However, this results in the high production cost. Further, the flow area is changed depending on the temperature and the compression condition of the insulative member, which may have a negative influence on the pressure loss of the channel and the distribution of fluid to each single cell.

The present invention has been made in view of the above-described problem with the prior art, and an object thereof is to provide a fuel cell stack that includes a manifold for distributing reaction gas in the stacking direction and that can suitably discharge generated water through the manifold without a decrease of the flowability of the reaction gas and an increase of the production cost.

Solution to Problem

The fuel cell stack according to the present invention includes a stacked plurality of single cells, each of the single cells having a membrane electrode assembly with a peripheral frame and a pair of separators that hold the peripheral frame and the membrane electrode assembly between them. Further, the fuel cell stack is configured such that the peripheral frames and separators of the single cells have respective distribution holes that continue to each other in the stacked state to form a manifold for distributing reaction gas, and at least a part of the inner wall of the manifold is formed in a continuous flat shape that extends in the stacking direction of the plurality of single cells.

Advantageous Effects of Invention

The fuel cell stack according to the present invention includes the manifold for the reaction gas in the stacking direction, in which at least a part of the inner wall of the manifold is formed in a gapless continuous flat shape extending in the stacking direction of the single cells by the end faces (the inner walls of the distribution holes) of the stacked members such as the frames and the separators without any special member. That is, the end faces of the stacked members continue to be flush with each other at least in a part of the inner wall of the manifold.

With this configuration, the fuel cell stack can suitably discharge generated water through the manifold without a decrease of the flowability of the reaction gas and an increase of the production cost. Further, since the fuel cell stack exhibits good water drainage, corrosion of the stacked members such as the frames and the separators due to the retained generated water can be prevented even when the end faces of the stacked members are exposed in the inner wall of the manifold.

DESCRIPTION OF EMBODIMENTS

First Embodiment

FIG. 1A and FIG. 1B to FIG. 4A and FIG. 4B illustrate a fuel cell stack according to a first embodiment of the present invention.

Figure 1A:
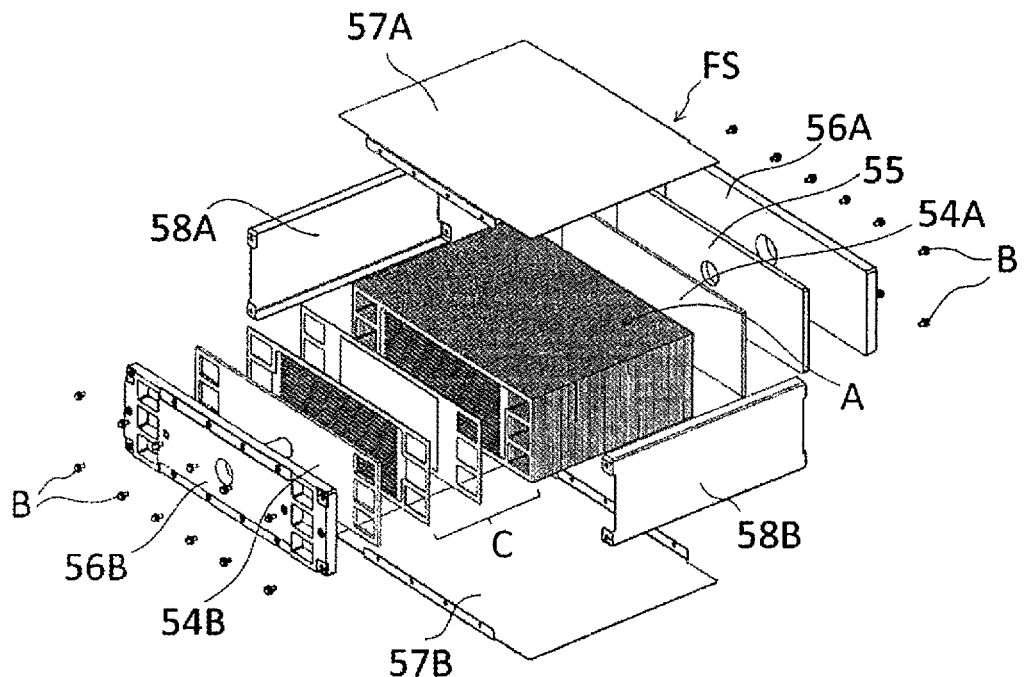
FIG. 1A is a perspective view of a fuel cell stack according to a first embodiment of the present invention in a disassembled state.

The fuel cell stack FS in FIG. 1A includes an end plate 56A that is disposed at one end (right end in FIG. 1A and FIG. 1B) in the stacking direction of a stack A of single cells C via a current collector plate 54A and a spacer 55, and an end plate 56B that is disposed at the other end via a current collector plate 54B. The fuel cell stack FS further includes fastening plates 57A, 57B that are disposed on both faces (upper and under faces in FIG. 1A and FIG. 1B) of the stack A corresponding to the long sides of the single cells C, and reinforcing plates 58A, 58B that are disposed on both faces corresponding to the short sides.

Figure 1B:
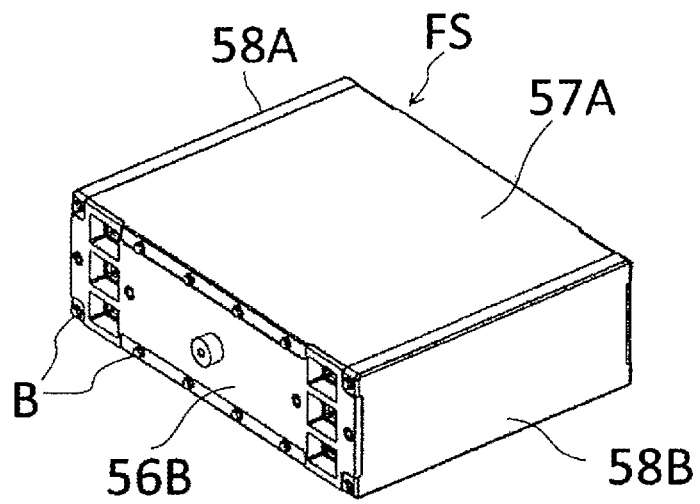
FIG. 1B is a perspective view thereof in an assembled state.

In the fuel cell stack FS, the fastening plates 57A, 57B and the reinforcing plates 58A, 58B are each coupled to both of the end plates 56B, 56B with bolts B. As described above, the fuel cell stack FS has a case-integrated structure as illustrated in FIG. 1B, which restrains and presses the stack A in the stacking direction to apply a predetermined contact surface pressure to each of the single cells C, so that the gas sealing property, the electrical conductivity and the like are maintained at high level.

Figure 2A:
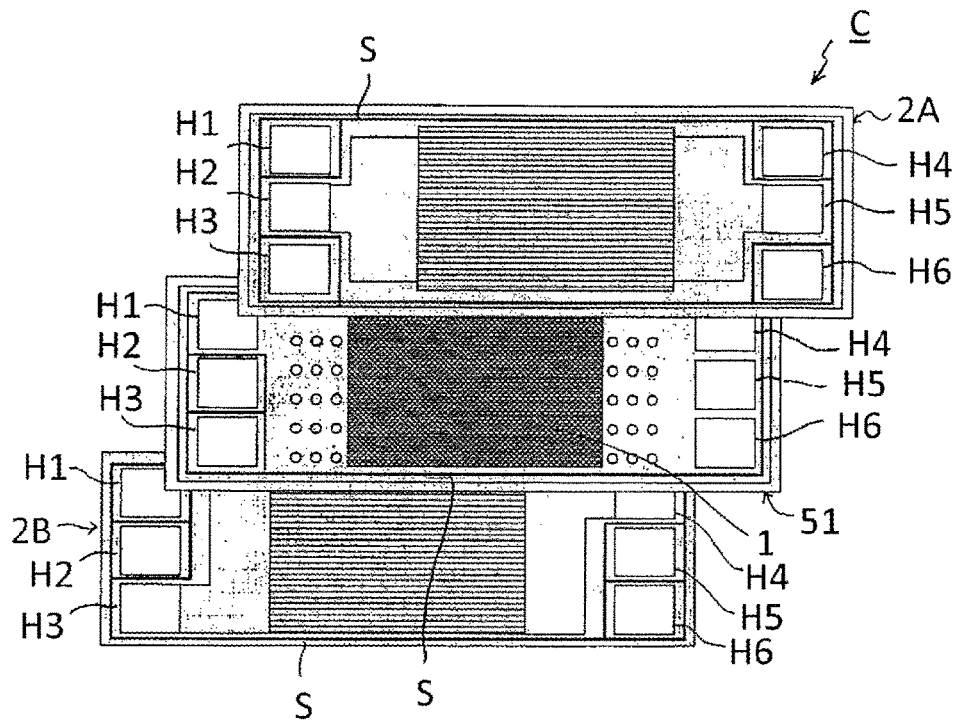
FIG. 2A is a plan view of a single cell of the fuel cell stack in FIG. 1A and FIG. 1B in a disassembled state.
Figure 2B:
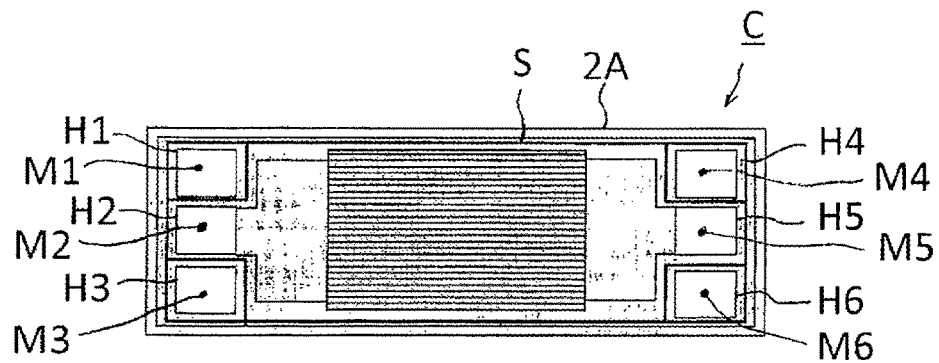
FIG. 2B is a plan view thereof in an assembled state.

As illustrated in FIG. 2A and FIG. 2B, each of the single cells C includes a membrane electrode assembly 1 with a peripheral frame 51, a pair of separators 2A, 2B that holds the frame 51 and the membrane electrode assembly 1 between them, in which anode and cathode gas channels are formed between the frame 51 and the membrane electrode assembly 1 and the respective separators 2A, 2B.

The membrane electrode assembly 1, which is generally referred to as an MEA, has a structure known in the art in which an electrolyte layer of a solid polymer is intervened between an anode electrode layer and a cathode electrode layer although the detailed structure is not shown in the figure.

The frame 51 is integrally formed with the membrane electrode assembly 1 by resin molding (e.g. injection molding). In the embodiment, the frame 51 has a rectangular shape, and the membrane electrode assembly 1 is disposed at the center thereof. Further, the frame 51 has distribution holes H1 to H3, H4 to H6 for distributing reaction gas, which are disposed such that three holes are arranged at both short sides.

The separators 2A, 2B are constituted by rectangular metal plate members having approximately the same length and width as the frame 5. For example, the separators 2A, 2B are made of stainless steel, and one plate has inverted faces to those of the other plate. In the illustrated example, the separators 2A, 2B have an uneven cross section at least at the center part opposed to the membrane electrode assembly 1. The uneven shape of the separators 2A, 2B continuously extends in the longitudinal direction. The tips of the corrugation are in contact with the membrane electrode assembly 1 while the recesses of the corrugation form the anode and cathode gas channels between the separators 2A, 2B and the membrane electrode assembly 1. Further, the separators 2A, 2B have distribution holes H1 to H6 at the short sides that are formed in the similar manner as the distribution holes H1 to H6 of the frame 51.

The above-described membrane electrode assembly 1 with the frame 51 and the separators 2A, 2B are laminated to each other to form a single cell C. In the single cell C, the distribution holes H1 to H6 of the frame 51 and the separators 2A, 2B are connected to corresponding holes to respectively form manifold M1 to M6 for distributing reaction gas. Further, a plurality of single cells C are stacked to constitute the fuel cell stack (stack A) FS, and a channel for cooling fluid is formed between single cells C adjacent in the stacking direction. In this way, the fuel cell stack FS has the manifolds M1 to M6 for distributing reaction gas in the stacking direction of the single cells C.

In the single cell C in FIG. 2B, the manifolds M1 to M3 at one end, which is the left side in the figure, are configured respectively to supply cathode gas (M1), to supply the cooling fluid (M2) and to discharge anode gas (M3) in the descending order. Further, in the single cell C, the manifolds M4 to M6 at the other end, which is the right side in the figure, are configured respectively to supply the anode gas (M4), to discharge the cooling fluid (M5) and to supply the cathode gas (M6) in the descending order. The anode gas is hydrogen-containing gas. The cathode gas is oxygen-containing gas, for example, air. The cooling fluid is, for example, water.

Figure 3A:
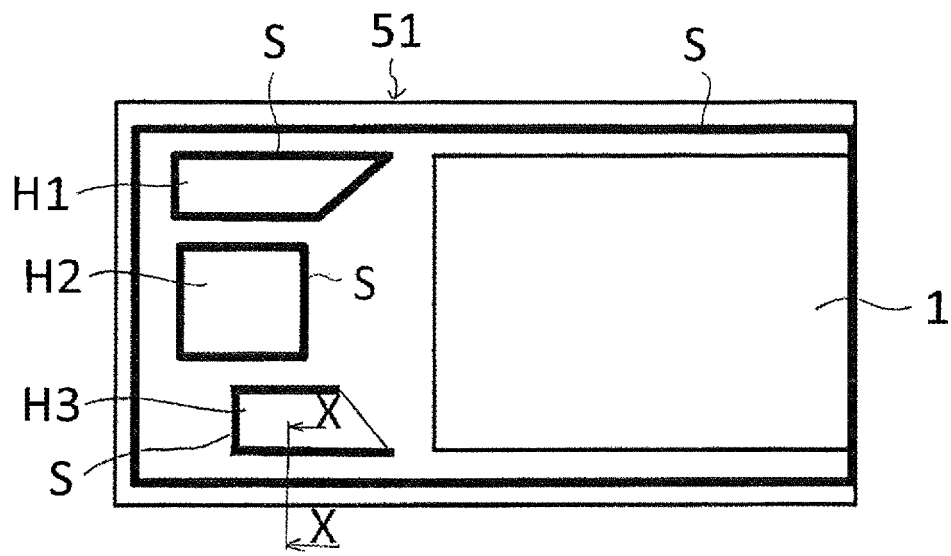
FIG. 3A is a partial plan view of the anode side of a membrane electrode assembly.
Figure 3B:
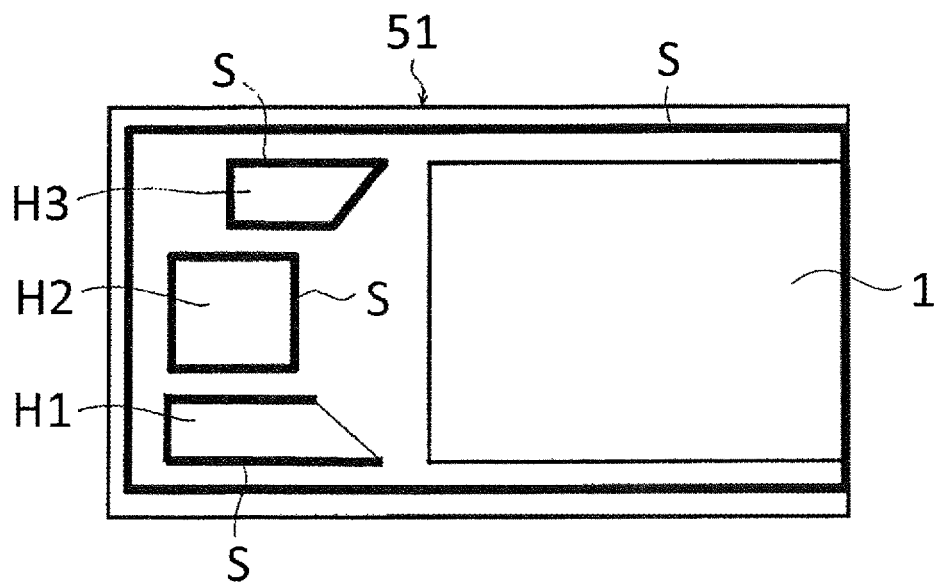
FIG. 3B is a partial plan view of the cathode side of the membrane electrode assembly.

As illustrated in the frame 51 and the membrane electrode assembly 1 of FIG. 3A and FIG. 3B, gas sealings S are provided to the single cell C along the edge of the frame 51 and around the distribution holes H1 to H3 to seal the gap to the separators 2A, 2B. The gas sealings S can be constituted by adhesive that bonds the frame 51 and the separators 2A, 2B to each other. The distribution holes H1 to H3 as illustrated in FIG. 3A and FIG. 3B have the same function as those illustrated in FIG. 1A and FIG. 1B and FIG. 2A and FIG. 2B although they have different shapes.

At the anode side as illustrated in FIG. 3A, the gas sealings S (bold lines) are provided along the edge except for a side of the distribution hole H3 for discharging the anode gas so as not to prevent distribution of the anode gas. In other words, an opening (discontinued part) for distributing the anode gas is formed in the gas sealings S at a suitable part of the edge of the distribution hole H3.

At the cathode side as illustrated in FIG. 3B, the gas sealings S (bold lines) are provided along the edge except for a side of the distribution hole H1 for supplying the cathode gas so as not to prevent distribution of the cathode gas. Although not shown in the figure, sealings are also provided between the single cells (between mutually opposed separators) along the edge except for respective sides of the distribution holes H2, H4 of the separators so as not to prevent distribution of the cooling fluid.

In the fuel cell stack FS including a stacked plurality of single cells C, at least a part of the inner walls of the manifolds M3, M6 for discharging reaction gas is formed in a continuous flat shape that extends in the stacking direction of the plurality of single cells C. To be more specific, in the fuel cell stack FS, the end faces (inner walls of the distribution holes H3, H6) of the stacked members, which are the frames 51 and the separators 2A, 2B, form the inner walls of the manifolds M3, M6 which are at least partly formed in a continuous flat shape that extends in the stacking direction of the plurality of single cells C. That is, the end faces of the stacked members (51, 2A, 2B) continue to be flush with each other at least in a part of the inner walls of the manifolds M3, M6.

The fuel cell stack FS of the embodiment is installed such that the long sides of the single cells C are horizontal as illustrated in FIG. 1A and FIG. 1B. In this position, the flat parts of the inner walls of the manifold M3, M6 are located at the lower side with respect to the direction of gravity. In addition to the lower side, the flat parts may extend to the other sides. Further, in addition to the discharging manifolds M3, M6, the inner walls of the supplying manifolds M1, M4 may also have a flat part.

Figure 4A:
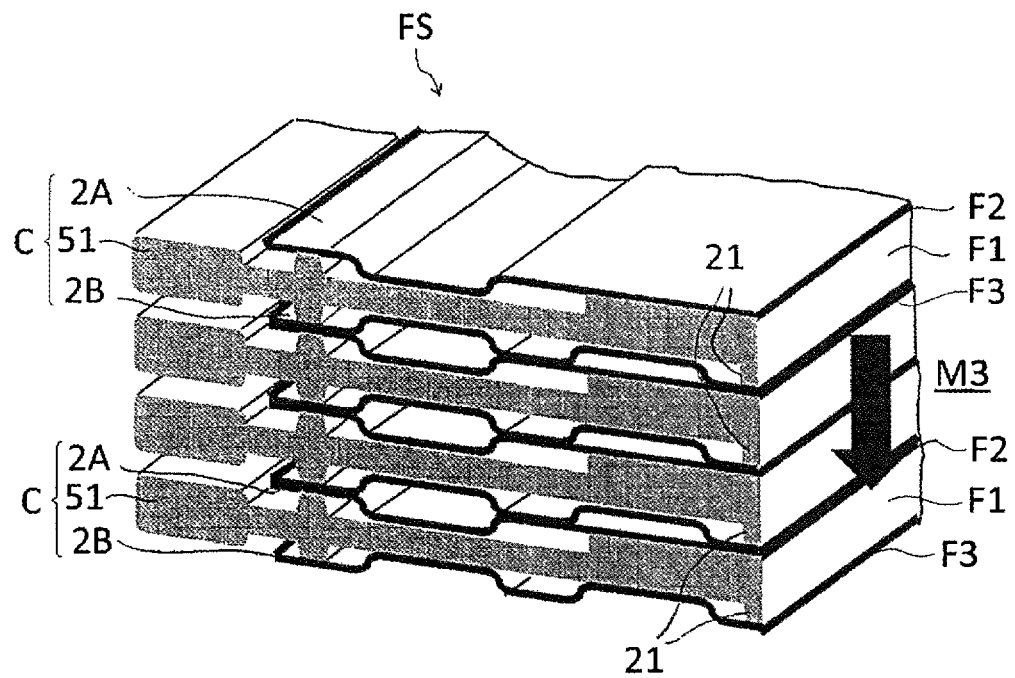
FIG. 4A is a perspective cross sectional view of the main part of a fuel cell stack taken along the line X-X in FIG. 3A.
Figure 4B:
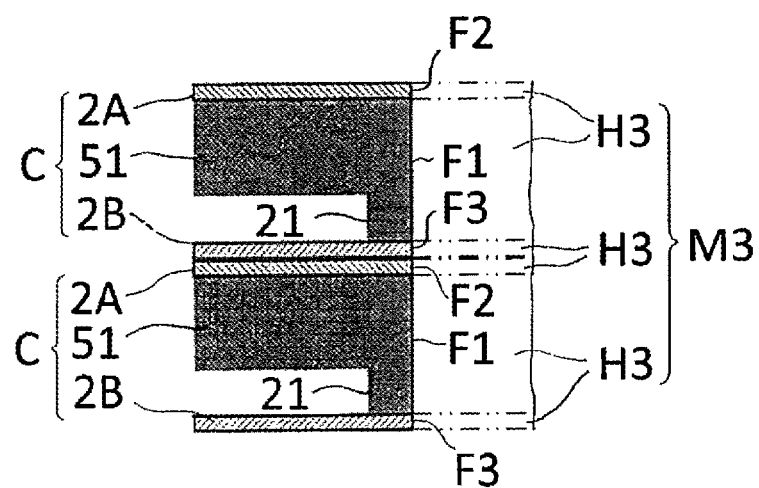
FIG. 4B is an enlarged cross sectional view of a distribution hole.

FIG. 4A and FIG. 4B are a perspective cross sectional view taken along the line X-X in FIG. 3A and FIG. 3B, illustrating the manifold M3 for discharging the anode gas. The gas in the manifold M3 flows downward as illustrated by the arrow in FIG. 4A, but the gas flows in the horizontal direction when the fuel cell stack FS is positioned as described above in FIG. 1A and FIG. 1B.

In the embodiment, as illustrated in the enlarged cross section of FIG. 4B, the frames 51 and the separators 2A, 2B of the single cells C have flattening faces F1, F2, F3 in the inner walls of the respective distribution holes H3. The flattening faces F1, F2, F3 continue to be flush with each other so that at least a part of the inner wall of the manifold M3 is formed in a continuous flat shape that extends in the stacking direction of the single cells C.

To be more specific, the frames 51 include integrally formed respective ribs 21 that protrude from the cathode side (lower side in FIG. 4A and FIG. 4B) along the inner peripheries of the distribution holes H3, and the inner walls of the distribution holes H3 including the ribs 21 forms the flattening faces F1. Further, the inner walls of the distribution holes H3 of the separators 2A, 2B respectively form the flattening faces F2, F3.

The above-described gas sealings S are provided between the edges of the respective distribution holes H3 of the anode separators 2A and the frames 51, between the edges of the respective distribution holes H3 of the frames 51 and the cathode separators 2B and between the edges of the cathode separators 2B and the anode separators 2A of adjacent single cells C.

Since the illustrated example of the fuel cell stack FS includes the ribs 21 that protrude from the cathode side of the frames 51, the gas sealings are provided between the top faces of the ribs 21 and the cathode separators 2B. The above-described openings for distributing the cathode gas can be formed by partly removing the ribs 21. While FIG. 4A and FIG. 4B illustrate the manifold M3 for discharging the anode gas as an example, it should be understood that the other manifolds M1, M4, M6 for the reaction gas may have the same configuration.

In the fuel cell stack FS with the above-described configuration, each of the single cells C generates electric power by electrochemical reaction when the anode gas and the cathode gas are supplied respectively to the anode electrode layer and the cathode electrode layer of the membrane electrode assembly 1. Along with the power generation, water is generated. The generated water is discharged mainly through the manifolds M3, M6 for discharging the reaction gas.

In this regard, in the fuel cell stack FS, the end faces of the stacked members, which are the frames 51 and the separators 2A, 2B, form the inner wall of the manifold M3, at least a part of which is formed in a continuous flat shape that extends in the stacking direction of the single cells C without any gaps.

Particularly in the fuel stack FS of the embodiment, the frames 51 and the separators 2A, 2B respectively have the flattening faces F1 to F3 in the inner walls of the distribution holes H3, and the flattening faces F1 to F3 continues to each other to be flash in the same flat face so that at least a part of the inner wall of the manifold M3 is formed in a continuous flat shape that extends in the stacking direction of the single cells C.

With this configuration, the fuel cell stack FS can suitably discharge the generated water through the manifold M3 without a decrease of the flowability of the reaction gas and an increase of the production cost. Further, in the fuel cell stack FS, the good drainage can prevent corrosion of the stacked members (51, 2A, 2B) due to the retained generated water even though the end faces (i.e. the flattening faces F1 to F3) of the stacked members, which are frames 51 and the separators 2A, 2B, are exposed in the inner wall of the manifold M3.

In the fuel cell stack FS of the embodiment, the generated water can be smoothly and rapidly discharged since the part formed in a flat shape in the inner wall of the manifold M3 is at least in the lower side of the inner wall of the manifold M3 with respect to the direction of gravity.

Second Embodiment

Figure 5A:
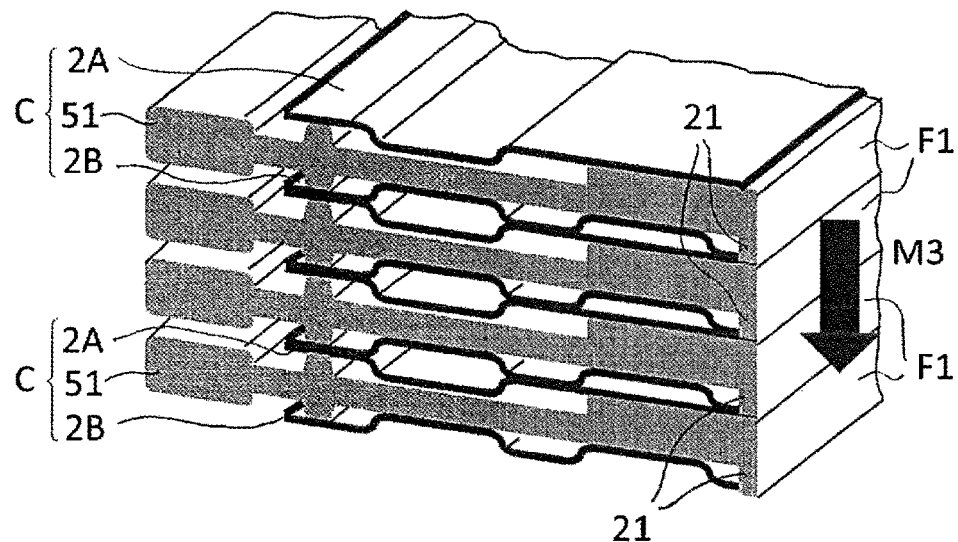
FIG. 5A is a perspective cross sectional view of the main part of a fuel cell stack according to a second embodiment of the present invention.
Figure 5B:
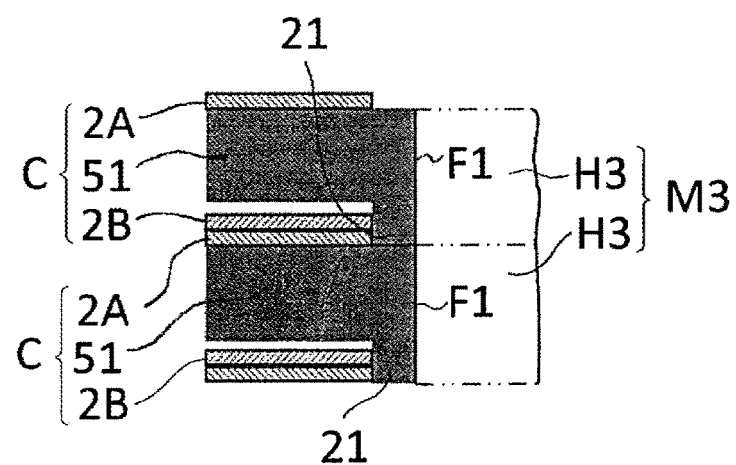
FIG. 5B is an enlarged cross sectional view of a distribution hole.

FIG. 5A and FIG. 5B illustrate a fuel cell according to a second embodiment of the present invention, which is a perspective cross sectional view and an enlarged cross sectional view taken along the line X-X in FIG. 3A and FIG. 3B as with the FIG. 4A and FIG. 4B. That is, FIG. 5A and FIG. 5B illustrate a manifold M3 for discharging anode gas. In the second to fourth embodiments in FIG. 5A and FIG. 5B to FIG. 7, the same reference signs are denoted to the same components as those of the first embodiment, and the detailed description thereof is omitted.

In the fuel cell stack FS in FIG. 5A and FIG. 5B, frames 51 of single cells C include respective ribs 21 that is disposed in the inner walls (edges) of distribution holes H3 and protrude at least from one side of the frames 51 to cover the inner walls of the distribution holes H3 of separators 2A, 2B, and respective flattening faces F1 that include the side walls of the ribs 21. The frames 51 of the illustrated example integrally include the ribs 21 that protrude towards the cathode side (lower side in FIG. 5A and FIG. 5B).

In the fuel cell stack FS, the flattening faces F1 of the frames 51 continue to be flush with each other so that at least a part of the inner wall of the manifold M3 is formed in a gapless continuous flat shape that extends in the stacking direction of the single cells C. That is, while the flattening faces F1 to F3 of the frames 51 and the separators 2A, 2B form the flat face of the manifold M3 in the previously-described first embodiment, only the flattening faces F1 of the frames 51 form the flat face of the manifold M3 in this embodiment.

As with the first embodiment, this fuel cell stack FS can suitably discharge generated water through the manifold M3 without a decrease of the flowability of reaction gas and an increase of the production cost. Further, since the ribs 21 of the resin frames 51 cover the inner walls of the distribution holes H3 of the metal separators 2A, 2B, generated water does not come in contact with these inner walls. This can impart a function of sufficiently protecting the inner walls against corrosion to the fuel cell stack FS, Third Embodiment FIG. 6 illustrates a fuel cell stack according to a third embodiment of the present invention, which is a cross sectional view of a distribution hole of a single cell taken along the line X-X in FIG. 3A and FIG. 3B.

Figure 6:
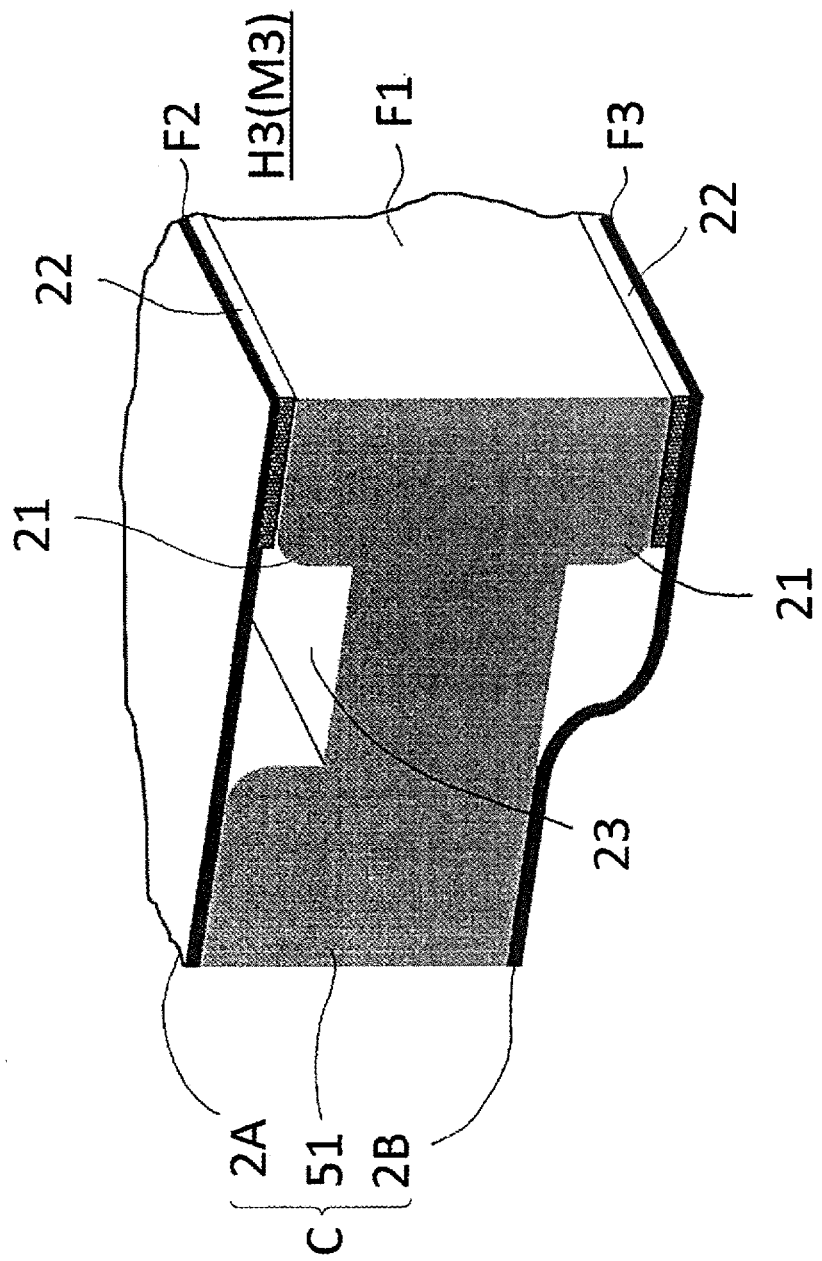
FIG. 6 is a perspective cross sectional view of the main part of a fuel cell stack according to a third embodiment of the present invention.

A frame 51 of the single cell C of FIG. 6 includes integrally formed ribs 21, 21 that protrude from both sides of the frame 51 in the inner wall (edge) of a distribution hole H3, and the inner wall including the side walls of the ribs 21, 21 forms a flattening face F1.

The single cell C includes adhesive portions in the edge of the distribution hole H3 of the frame 51 for adhesion to the opposed members adjacent in the stacking direction and pits for adhesive 22 on the opposite side of the adhesive portions from the distribution hole.

The adhesive 22 is applied on the adhesive portions and serves as sealing after curing. The adhesive portions are equivalent of the above-described gas sealings (see FIG. 3A and FIG. 3B) and correspond to the top faces of the ribs 21 in the illustrated example. The opposed members adjacent in the stacking direction are anode and cathode separators 2A, 2B. The pits 23, which are recesses in the frame 51 formed in a groove shape, allow to release excess adhesive 22 when the separators 2A, 2B are joined with the adhesive 22 applied on the adhesive portions.

As with the previously-described embodiments, the fuel cell stack, in which a plurality of fuel cells C with the above-described configuration is stacked, can suitably discharge generated water through the manifold M3 without a decrease of the flowability of reaction gas and an increase of the production cost. Furthermore, the gaps between the frames 51 and the separators 2A, 2B are completely filled with the adhesive 22, and the pits 23 can release excess adhesive 22 to prevent it from being extruded to the distribution holes H3. Therefore, the inner wall of the manifold M3 can be formed in a flat shape.

Fourth Embodiment

Figure 7:
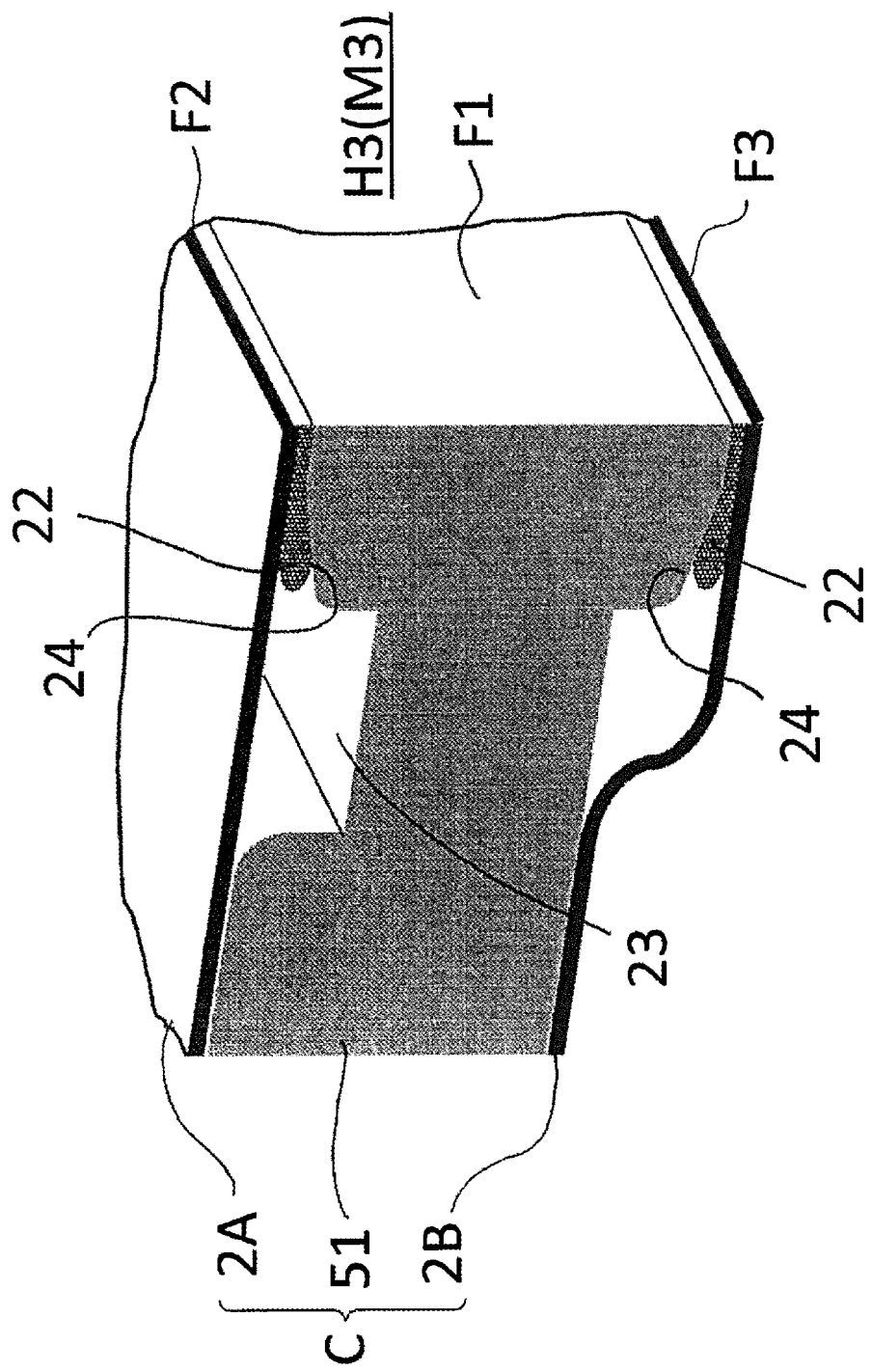
FIG. 7 is a perspective cross sectional view of the main part of a fuel cell stack according to a fourth embodiment of the present invention.

FIG. 7 illustrates a fuel cell stack according to a fourth embodiment of the present invention, which is a cross sectional view of a distribution hole of a single cell taken along the line X-X in FIG. 3A and FIG. 3B.

A frame 51 of the single cell C of FIG. 7 includes integrally formed ribs 21, 21 that protrude from both sides of the frame 51 in the inner wall (edge) of the distribution hole H3, and the inner wall including the side walls of the ribs 21, 21 forms a flattening face F1.

The single cell C includes adhesive portions in the edge of the distribution hole H3 of the frame 51 for adhesion to the opposed members (separators 2A, 2B) adjacent in the stacking direction and pits 23 for adhesive 22 on the opposite side of the adhesive portions 22 from the distribution hole H3. Further, the adhesive portions have inclined faces 24 that form downward slopes to the pits 23.

As with the previously-described embodiments, the fuel cell stack, in which a plurality of single cells C with the above-described configuration is stacked, can suitably discharge generated water through the manifold M3 without a decrease of the flowability of reaction gas and an increase of the production cost. Furthermore, the gaps between the frames 51 and the separators 2A, 2B are completely filled with the adhesive 22, and the inclined faces 24 can actively release excess adhesive 22 to the pits 23. This can prevent extrusion of the adhesive 22 to the distribution holes H3 more reliably, and the inner wall of the manifold M3 can therefore be formed in a flat shape.

The configuration of the fuel cell stack of the present invention is not limited to the above-described embodiments. The details of the configuration can be suitably changed, or the configurations of the above-described embodiments can be suitable combined without departing from the features of the present invention.

REFERENCE SINGS LIST

1 Membrane electrode assembly
2A, 2B Separator
21 Rib
22 Adhesive
23 Pit
24 Inclined face
51 Frame
C Single cell
FS Fuel cell stack
F1 Flattening face of frame
F2, F3 Flattening face of separator
H1 to H6 Distribution hole
M1 Manifold for supplying cathode gas
M3 Manifold for discharging anode gas
M4 Manifold for supplying anode gas
M6 Manifold for discharging cathode gas

The invention claimed is:

1. A fuel cell stack comprising a stacked plurality of single cells, each of the single cells having a membrane electrode assembly with a peripheral frame and a pair of separators holding the peripheral frame and the membrane electrode assembly between them, wherein
the peripheral frame and the separators of each of the single cells have distribution holes that continue to each other in a stacked state to form a manifold configured to distribute reaction gas,
at least a part of an inner wall of the manifold is formed in a continuous flat shape that extends in a stacking direction of the single cells, and
the peripheral frame of each of the single cells comprises a rib that is disposed in an inner wall of each of the distribution holes and that protrudes at least from one side of the peripheral frame,
the rib of the peripheral frame of each of the single cells protrudes at least from one side of the peripheral frame to cover the inner wall of the distribution hole of the separator,
the peripheral frame of each of the single cells further comprises a flattening face that includes a side wall of the rib, and
the flattening face of the peripheral frame of each of the single cells continues to an adjacent flattening face such that at least a part of the inner wall of the manifold is formed in the continuous flat shape that extends in the stacking direction of the single cells.

2. The fuel cell stack according to claim 1, wherein a flat part of the inner wall of the manifold extends at least in a lower side with respect to a direction of gravity.

3. The fuel cell stack according to claim 1, wherein the peripheral frame of each of the single cells comprises an adhesive portion configured for adhesion to an opposed member adjacent in the stacking direction at an edge of each of the distribution holes and a pit configured for adhesive on an opposite side of the adhesive portion from the distribution hole.

4. The fuel cell stack according to claim 3, wherein the adhesive portion comprises an inclined face that forms a downward slope to the pit.

* * * * *